(12) United States Patent
Vanderzanden et al.

(10) Patent No.: US 11,025,072 B2
(45) Date of Patent: Jun. 1, 2021

(54) SYSTEM AND METHOD FOR OPERATING AN ELECTRICAL ENERGY STORAGE SYSTEM

(71) Applicant: ESS TECH, INC., Wilsonville, OR (US)

(72) Inventors: Aaron Vanderzanden, Forest Grove, OR (US); Steve Ernst, Portland, OR (US)

(73) Assignee: ESS Tech, Inc., Wilsonville, OR (US)

( * ) Notice: Subject to any disclaimer, the term of this patent is extended or adjusted under 35 U.S.C. 154(b) by 65 days.

(21) Appl. No.: 16/163,023

(22) Filed: Oct. 17, 2018

(65) Prior Publication Data

US 2020/0127466 A1    Apr. 23, 2020

(51) Int. Cl.
*H02J 7/04* (2006.01)
*H02J 7/16* (2006.01)
*H02J 7/00* (2006.01)
*H01M 8/18* (2006.01)

(52) U.S. Cl.
CPC ........... *H02J 7/0013* (2013.01); *H01M 8/188* (2013.01); *H02J 7/0042* (2013.01)

(58) Field of Classification Search
USPC .................................................. 320/104, 162
See application file for complete search history.

(56) References Cited

U.S. PATENT DOCUMENTS

| | | | | |
|---|---|---|---|---|
| 5,602,481 A | * | 2/1997 | Fukuyama | H02J 7/0016 324/426 |
| 6,235,418 B1 | * | 5/2001 | Pedicni | H01M 2/0207 429/407 |
| 6,624,612 B1 | | 9/2003 | Lundquist | |
| 7,714,540 B2 | * | 5/2010 | Shibuya | H02J 7/0018 320/104 |
| 9,774,206 B2 | | 9/2017 | Kim et al. | |
| 2007/0025135 A1 | * | 2/2007 | Yamamoto | H02J 7/345 365/132 |
| 2008/0007204 A1 | * | 1/2008 | Yano | B60L 58/21 320/104 |
| 2008/0111556 A1 | * | 5/2008 | Yano | H02J 7/0026 324/433 |
| 2008/0138677 A1 | * | 6/2008 | Edlund | H01M 8/04313 429/431 |
| 2008/0150516 A1 | * | 6/2008 | Yonezawa | G01R 19/16542 324/123 R |
| 2008/0238432 A1 | | 10/2008 | Botker et al. | |
| 2008/0272739 A1 | | 11/2008 | Carrier et al. | |

(Continued)

FOREIGN PATENT DOCUMENTS

KR    101590532 B1    2/2016

OTHER PUBLICATIONS

Vanderzaden, A., "Power Conversion System and Method," U.S. Appl. No. 15/844,250, filed Dec. 15, 2017, 38 pages.

(Continued)

*Primary Examiner* — Brian Ngo
(74) *Attorney, Agent, or Firm* — McCoy Russell LLP

(57) ABSTRACT

Systems and methods for operating an electric energy storage system are described. The systems and methods include ways of coupling electric energy storage cell stacks to an electric conductor or bus. The coupling is performed to reduce current flow through contactors and to increase a life span of the contactors.

18 Claims, 5 Drawing Sheets

(56) References Cited

U.S. PATENT DOCUMENTS

| | | | | |
|---|---|---|---|---|
| 2012/0244406 A1* | 9/2012 | Xia | ............... | H01M 4/926 429/107 |
| 2014/0042980 A1 | 2/2014 | Floros et al. | | |
| 2014/0134465 A1* | 5/2014 | Kumamoto | ........... | H01M 8/188 429/61 |
| 2014/0176149 A1* | 6/2014 | Mizoguchi | ........... | G01R 31/396 324/434 |
| 2014/0266222 A1* | 9/2014 | Baughman | ............... | H02J 7/00 324/426 |
| 2014/0272493 A1* | 9/2014 | Evans | ............... | H01M 8/20 429/63 |
| 2014/0342268 A1* | 11/2014 | Kato | ............... | H01M 8/188 429/482 |
| 2014/0363747 A1* | 12/2014 | Evans | ............... | H01M 8/20 429/409 |
| 2015/0255824 A1* | 9/2015 | Evans | ............... | H01M 8/184 429/418 |
| 2016/0293992 A1* | 10/2016 | Song | ............... | H01M 8/188 |
| 2016/0308234 A1* | 10/2016 | Reece | ............... | H01M 8/20 |
| 2016/0329618 A1* | 11/2016 | Zhang | ............... | H01M 12/08 |
| 2017/0012307 A1* | 1/2017 | Kumamoto | ............. | H01M 8/20 |
| 2017/0179516 A1* | 6/2017 | Evans | ............... | H01M 8/04731 |
| 2018/0123362 A1* | 5/2018 | Zheng | ............... | H02J 7/0013 |
| 2018/0316032 A1 | 11/2018 | Song et al. | | |
| 2018/0316033 A1 | 11/2018 | Evans | | |
| 2018/0316035 A1* | 11/2018 | Song | ............... | H01M 8/04037 |
| 2019/0072617 A1* | 3/2019 | Sato | ............... | H02J 7/0019 |
| 2019/0103750 A1* | 4/2019 | Kristensen | ............ | H02J 7/0016 |
| 2019/0190400 A1* | 6/2019 | Vanderzaden | ...... | H02M 7/4807 |
| 2019/0379233 A1* | 12/2019 | Li | ............... | H02J 7/04 |
| 2020/0044459 A1* | 2/2020 | Lee | ............... | H01M 10/441 |

OTHER PUBLICATIONS

Walker-Stern, I. et al., "Power Delivery System and Method," U.S. Appl. No. 16/153,447, filed Oct. 5, 2018, 30 pages.

ISA Korean Intellectual Property Office, International Search Report and Written Opinion Issued in Application No. PCT/US2019/051349, dated Dec. 27, 2019, WIPO, 11 pages.

* cited by examiner

SYSTEM AND METHOD FOR OPERATING AN ELECTRICAL ENERGY STORAGE SYSTEM

FIELD

The present description relates to a system and method for operating an electric energy storage system. The methods and systems may be particularly useful for electrical power systems that include a plurality of electric energy storage cell stacks.

BACKGROUND AND SUMMARY

An electrical energy storage system may include electrical energy storage cells (e.g., battery cells) that are arranged in series and in parallel. Electrical energy storage cells that are arranged in series increase the voltage potential of the electric energy storage system. Electric energy storage cells that are arranged in parallel increase the power output capacity of the electric energy storage system. The electric energy storage cells of one electric energy storage cell stack may be charged to a level (e.g., voltage) such that the voltage of the one electric energy storage cell stack that includes the electric energy storage cells is lower or higher than levels of other electric energy storage cell stacks within the electrical energy storage system. The difference in charge stored between the electric energy storage cell stacks may cause larger amounts of current to flow from more highly charged electric energy storage cell stacks to electric energy storage cell stacks having lower charge levels. This may increase the possibility of degradation within the electrical energy storage system. Therefore, it may be desirable to provide a way of coupling electric energy storage cells from different electric energy storage cell stacks in a way that may reduce the possibility of degradation within the electric energy storage system.

The inventors herein have recognized the above-mentioned issues and have developed a method for operating an electric energy storage system, comprising: sequentially closing a plurality of contactors that selectively couple a plurality of electric energy storage cell stacks to an electric power conductor within the electric energy storage system according to individual voltages of each of the plurality of electric energy storage cell stacks via a controller.

By sequentially closing a plurality of contactors that may selectively couple a plurality of electrical energy storage cell stacks to an electric power conductor within an electric energy storage system according to the individual voltages of each of the plurality of electric energy storage cell stacks, it may be possible to provide the technical result of reducing current flow between the plurality of electric energy storage cell stacks. In one example, a contactor may be associated with or be part of an electric energy storage cell stack in a system that includes a plurality of electric energy cell stacks. The contactors associated with or included in the electric energy cell stacks may be closed from open states in a one after the other order. The order may begin by closing a first contactor that is associated with or that is part of electric energy storage cell stack that has a lowest voltage of the plurality of electric energy storage cell stacks. Shortly thereafter, a second contactor that is associated with or part of an electric energy storage cell that has the second lowest voltage of the plurality of electric energy storage cells may be closed so that two electric energy storage cell stacks are now coupled together. Coupling the lowest voltage electric energy storage cell stack to the second lowest voltage electric energy storage cell stack may raise the voltage of the lowest voltage electric energy storage cell stack and reduce current flow to the lowest voltage electric energy storage cell stack as compared to the highest voltage electric energy storage cell stack being coupled to the lowest voltage electric energy storage cell stack. Accordingly, current flow inside of the electric energy storage system may be reduced, thereby increasing a life cycle of components within the electric energy storage system.

The present description may provide several advantages. In particular, the approach may reduce the possibility of component degradation with an electric power system. Further, the approach may be applied without having to include function specific current limiting devices between electric energy storage cell stacks. In addition, the approach may be applied to a variety of different types of electric energy storage cell stacks.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
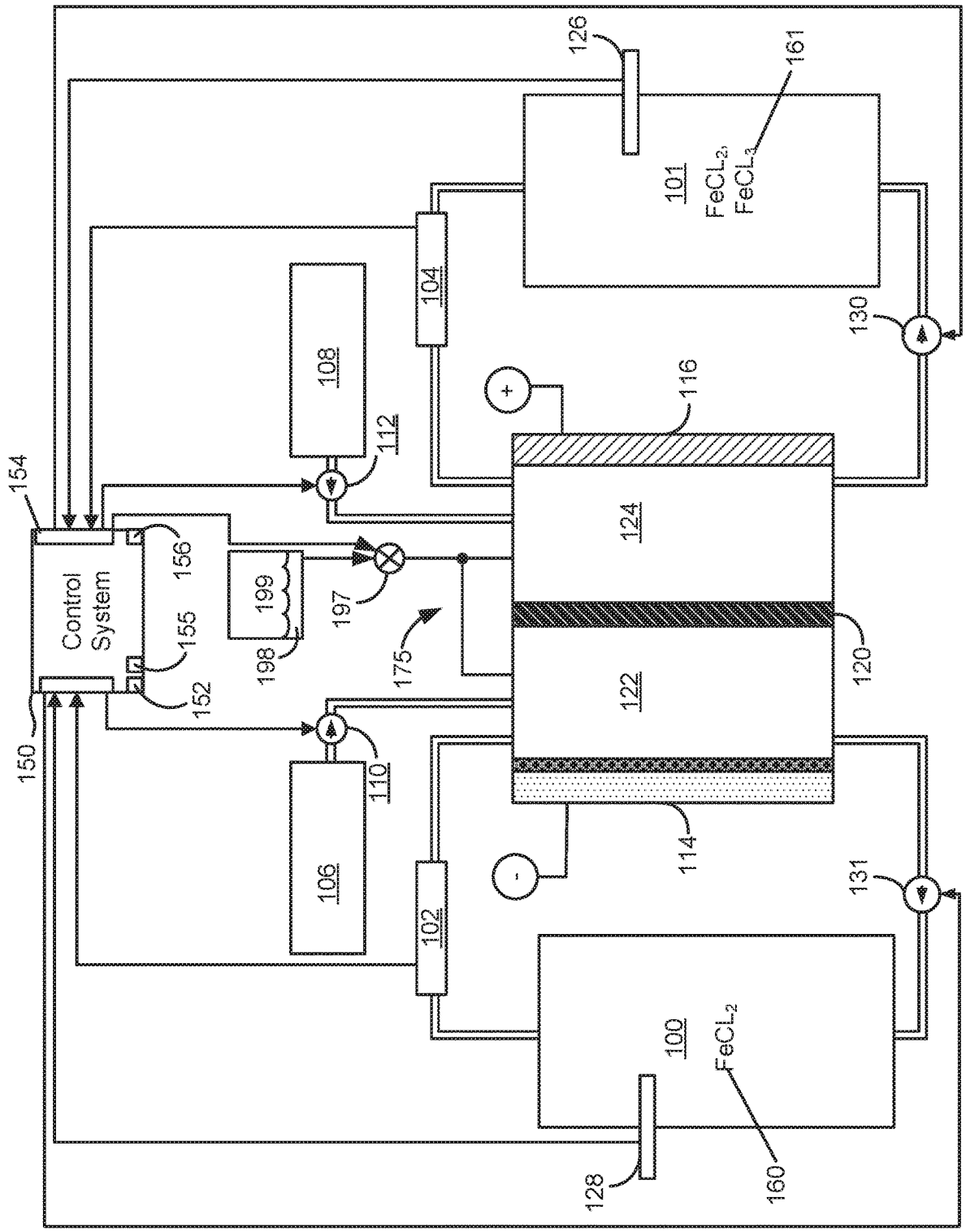
FIG. 1 is a schematic diagram showing a single cell of an electric power storage and delivery system.
Figure 2:
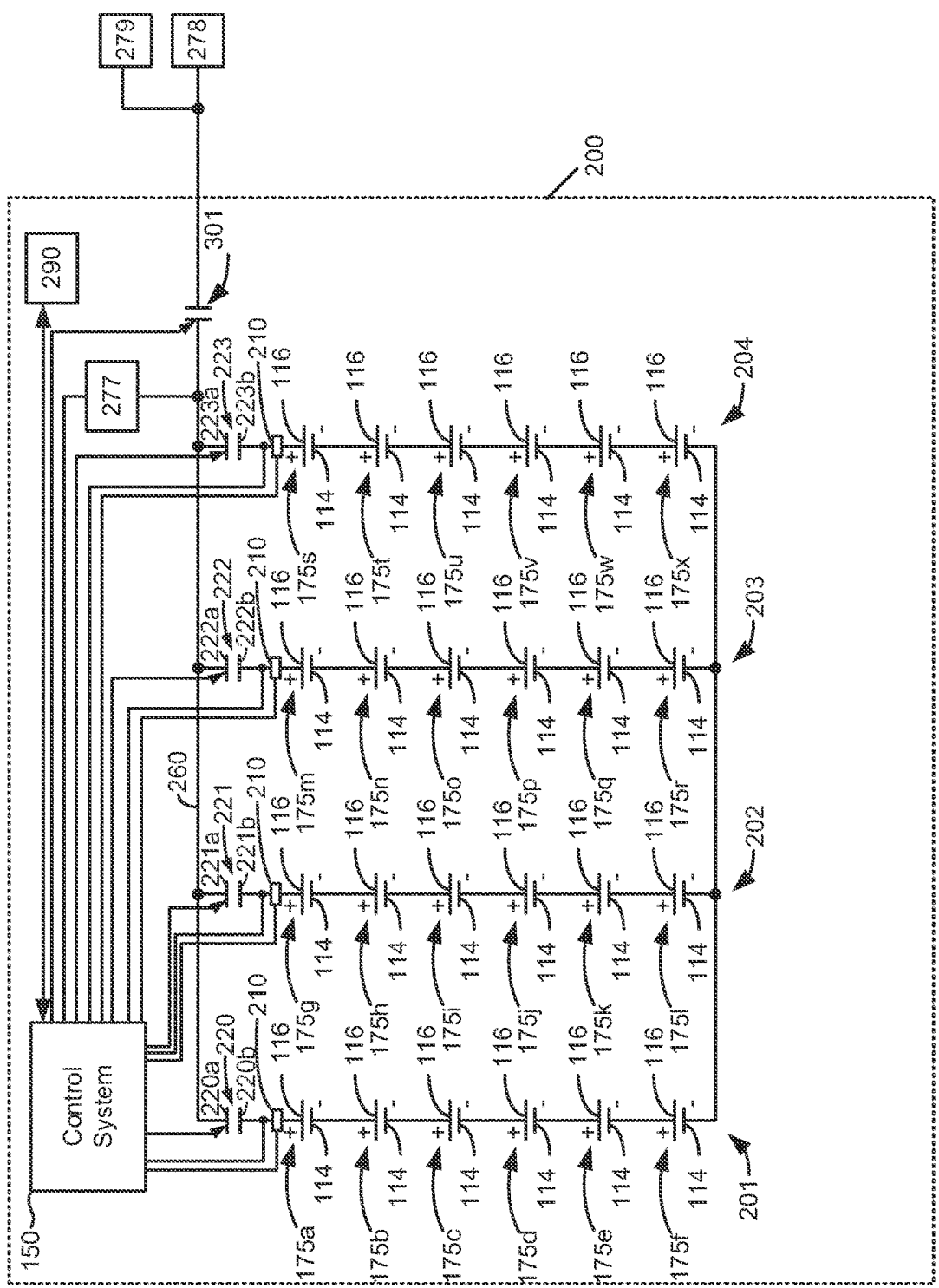
FIG. 2 is a schematic diagram of an electric power system that includes a plurality of electric power cells of the type shown in FIG. 1.
Figure 3:
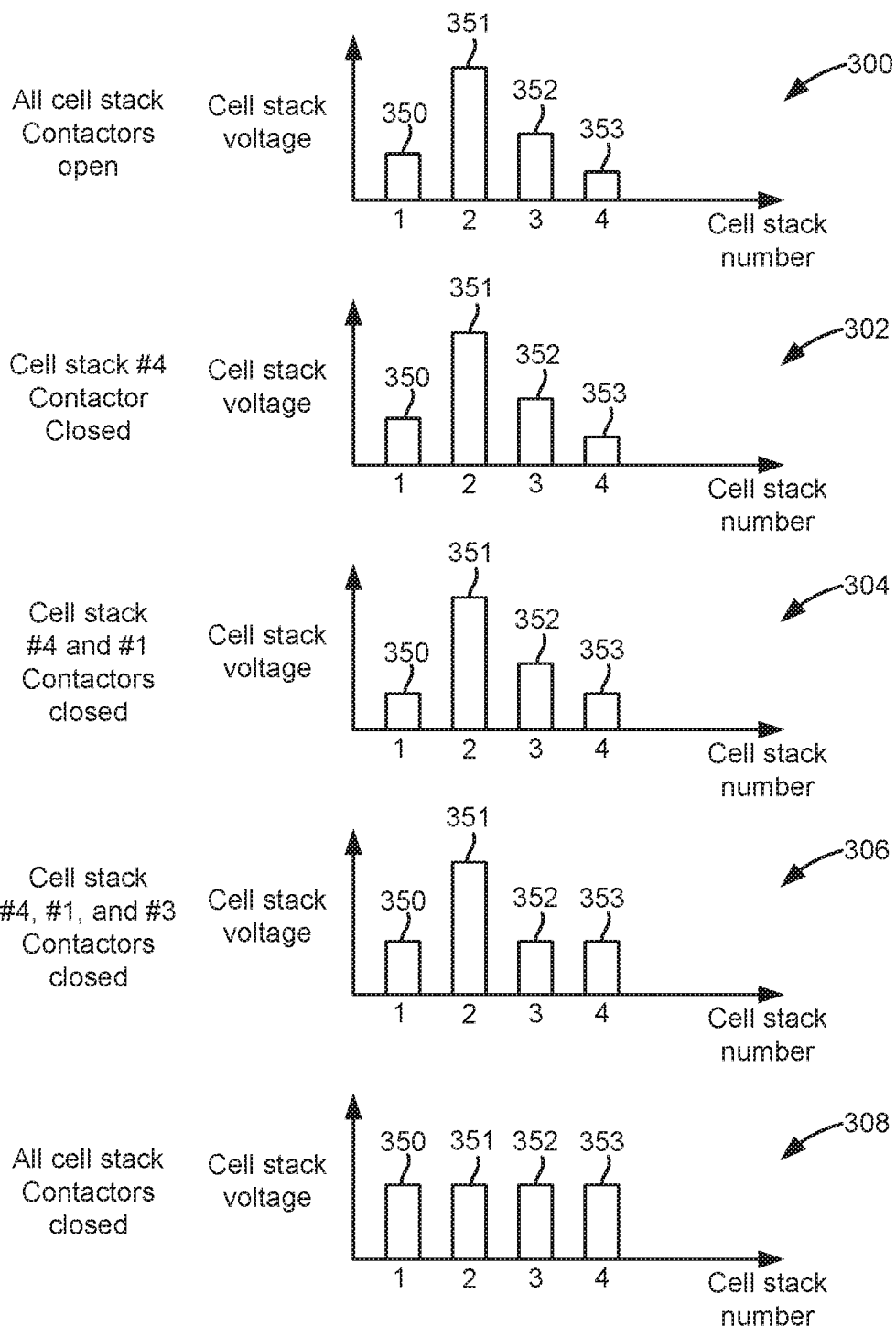
FIG. 3 shows several plots of electric energy storage cell voltage levels during a process to electrically couple a plurality of electric energy storage cells.
Figure 4:
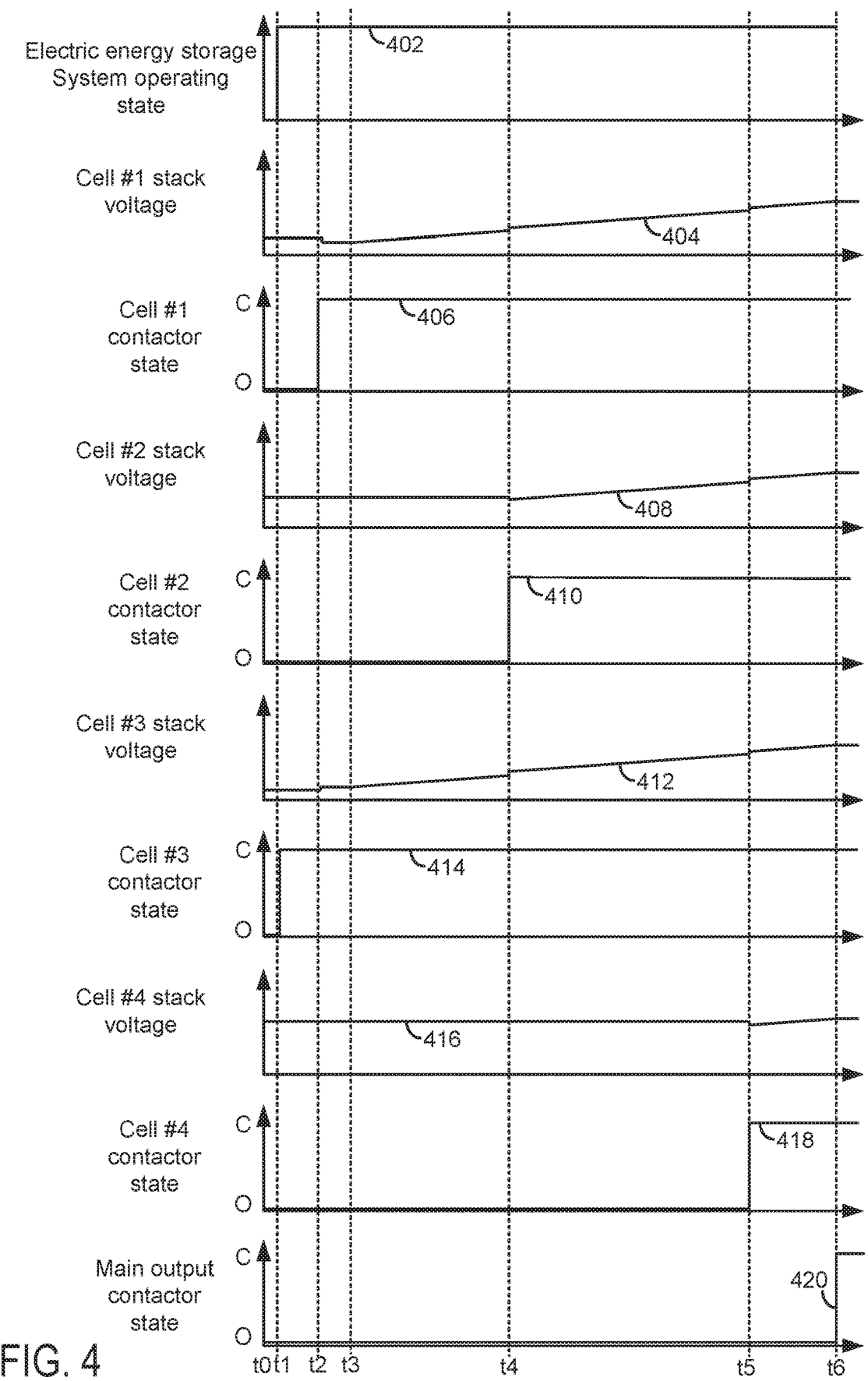
FIG. 4 shows a second example sequence for electrically coupling a plurality of electric energy storage cells in parallel.
Figure 5:
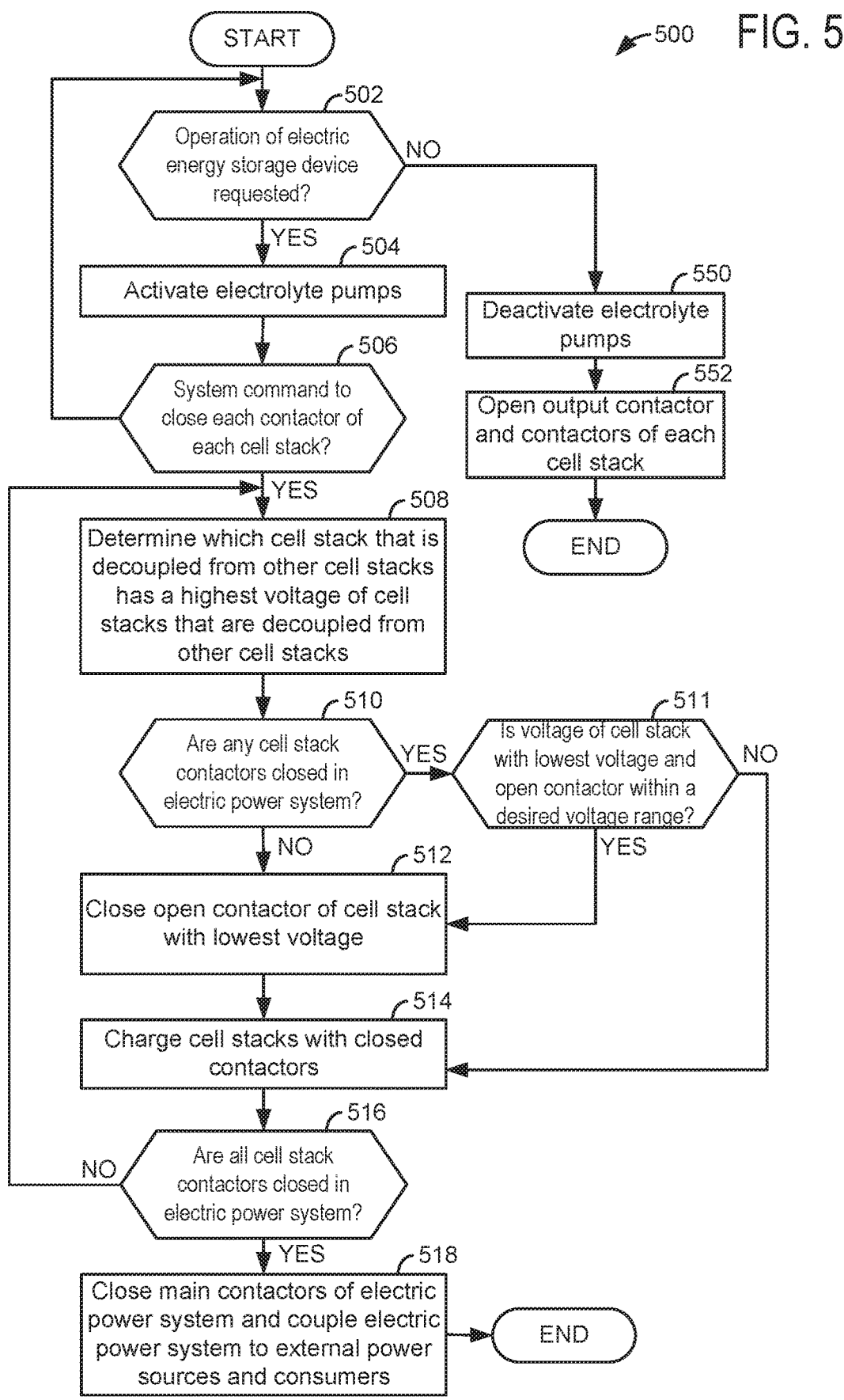
FIG. 5 shows a method for operating an electric power storage system.

The present description is related to operating an electric energy storage system (e.g., a direct current (DC) power source) as shown in FIG. 1. The electric energy storage system may store electrical energy that is generated via photovoltaic cells, hydroelectric power, wind power, or via chemical energy. The electric energy storage system may output DC power that may be distributed as alternating current AC after a conversion process. The electric energy storage system may include an iron flow device as shown in FIGS. 1 and 2. The electric energy storage system may combine a plurality of electric energy storage cell stacks in parallel as shown in FIG. 2. The electric energy storage system may operate as shown in FIGS. 3 and 4 according to the method of FIG. 5. A method for operating the electric energy storage system is shown in FIG. 5.

Referring to FIG. 1, an example of an all iron redox flow battery (IFB) cell is shown. The IFB cell 175 is an electric energy storage cell. The IFB cell may be supplied with plating electrolyte 160 (e.g., $FeCL_2$) that is stored in plating electrolyte tank 100. The IFB may also include redox electrolyte 161 that is stored in redox electrolyte tank 101. The plating electrolyte and redox electrolyte may be a suitable salt dissolved in water, such as $FeCl_2$ or $FeCl_3$. Both the plating electrolyte and redox electrolyte may use the same salt at different molar concentrations, a feature of the IFB not available in batteries with different reactive compounds. Tank 100 may be in fluidic communication with negative reactor 122. Tank 101 may be in fluidic communication with positive reactor 124. Electrolyte in tank 100 and negative reactor 122 is in fluidic isolation from electrolyte in tank 101 and positive reactor 124. Separating the negative and positive reactors and their respective electrolytes is barrier 120. The barrier may embodied as a membrane barrier, such as an ion exchange membrane or a microporous membrane, placed between the plating electrolyte and redox electrolyte to prevent electrolyte cross-over and provide ionic conductivity.

Sensors 102 and 104 may be used to determine the chemical properties of the electrolyte, including pH and may be embodied as an optical sensor. Probes 126 and 128 may additionally or alternatively be used to determine the chemical properties (discussed below) of the electrolytes. Other examples may have a plating electrolyte probe, plating electrolyte sensor, redox electrolyte probe, redox electrolyte sensor, or some combination thereof. The probe may also be placed inside the reacting portion of the IFB in negative reactor 122 and positive reactor 124. An acid additive may be stored in additional tanks 106 and 108. These may contain different additives and be controlled by different routines. In other examples, the IFB may also have either a positive side additive or a negative side additive and not both. The positive side additive may be accelerated into the positive reactor 124 by positive additive pump 112; the negative additive may be accelerated into the negative reactor 122 by negative additive pump 110. Alternately, the electrolyte additives may be pumped into tanks 100 and 101. Pumps 110 and 112 may be actuated via a control system 150 that is communicatively coupled to the pumps. The control system may be responsive to probe 126, probe 128, sensor 102, sensor 104, or any combination thereof. Electrolyte may be pumped to or from the negative reactor 122 by pump 131. Electrolyte may be pumped to or from the positive reactor 124 via pump 130. The IFB includes a negative electrode 114 and a positive electrode 116.

Control system 150 may include inputs and outputs 154 (e.g., digital inputs, digital outputs, analog inputs, analog outputs, pulse width outputs, etc.), a central processor 152, random-access memory 155, and read-only (e.g., non-transitory memory) 156. The controller 150 receives signals from the various sensors shown in FIGS. 1 and 2. Controller 150 employs the actuators shown in FIGS. 1 and 2 to adjust electric energy storage system operation based on the received signals and instructions stored in memory of controller 150. For example, controller 150 may adjust a speed of pump 130 according to output of sensor 126.

Control system 150 may also selectively activated and deactivate valve to allow de-ionized water 198 in tank 199 into positive and negative reactors 122 and 124. In one example, controller 150 may open valve 197 and allow de-ionized water to flow into positive and negative reactors 122 and 124 during an electric energy storage cell flushing process.

Referring now to FIG. 2, a schematic block diagram of an electric power system that includes a plurality of the IFB cells 175a-175x and controller 150. Controller 150 may read voltage levels of and current flow through electric energy storage cell stacks 201-204 via sensors 210. Controller 150 may also selectively operate contactors 220-223, main contactor 301, and charger 277. Controller 150 may receive input from and provide output to human/machine interface 290, which may be a display panel, remote device, push-button panel, or other known interface.

IFB cells 175a-175x are the same as cell 175 shown in FIG. 1. The letter designations are provided simply to identify individual electric energy storage cells. IFB cells 175a-175f are arranged in a first cell stack 201. IFB cells 175g-175l are arranged in a second cell stack 202. IFB cells 175m-175r are arranged in a third cell stack 203. IFB cells 175s-175x are arranged in a fourth cell stack 204. Although FIG. 2 shows four cell stacks in electric energy storage system 200, electric energy storage system 200 is not limited to four electric energy storage cell stacks. Rather, electric energy storage system 200 may include from 1 to N electric energy storage cell stacks, where N is an integer number. Further, each electric energy storage cell stack shown in FIG. 2 includes six electric energy storage cells (e.g., 175a-175f). However, electric energy storage system 200 is not limited to six electric energy storage cells in each electric energy storage cell stacks. Rather, electric energy storage system 200 may include from 1 to M electric energy storage cells in an electric energy storage cell stack, where M is an integer number. Each of electric energy storage cells 175a-175x includes a positive side 116 and a negative side 114.

Each electric energy storage cell stacks 201-204 includes a contactor 220-223 for selectively individually coupling and decoupling electric energy storage cell stacks 201-204 to electric power conductor or bus 260. Contactor 220 includes a first side 220a, which is directly coupled to electric power conductor 260, and a second side 220b, which is directly coupled to electric energy storage cell stack 201. Likewise, contactors 221-223 include first side's 221a-223a, which are directly coupled to electric power conductor 260, and second side's 221b-223b, which are directly coupled to electric energy storage cell stacks 202-204. Contactors 220-223 may be open (e.g., not allowing current to flow through the contactor) when electric energy storage system 200 is deactivated. Further, contactors 220-223 may be individually opened and closed (e.g., allowing current flow through the contactor) to selectively electrically isolate selected electric energy storage cell stacks 201-204 from electric power conductor 260 when one or more of electric energy storage cells 175a-175x are flushed with de-ionized water. Contactors 220-223 may be selectively opened and closed via controller 150.

Charger 277 may supply electrical charge to electric power conductor 260 when commanded by controller 150. Electrical power conductor 260 may distribute the electrical charge to electric energy storage cell stacks 201-204 when contactors 220-223 are closed. Further, charger 277 may supply electrical charge individually to individual electric energy storage cell stacks 201-204. For example, charger 277 may only charge electric energy storage cell stack 201 when contactor 220 is closed and contactors 221-223 are open. In another example of individually charging electric energy cell stacks, charger 277 may only charge electric energy storage cell stacks 201 and 204 when contactors 220 and 223 are closed and contactors 221 and 222 are open. Charger 277 may be selectively activated to supply charge and deactivated to cease supplying charge via controller 150. Charger 277 may also be commanded to supply charge until electric power conductor 260 and electric energy storage cell stacks that are electrically coupled to electric power conductor 260 are at charge or voltage levels as requested by controller 150.

Electric energy storage system 200 also includes a main contactor 301 that may be opened and closed via controller 150. Main contactor 301 may be closed to electrically couple electric power conductor 260 to external electric energy sources (e.g., photovoltaic cells, wind turbines, hydroelectric generators, etc.) 279 and electrical energy consumers (e.g., house hold appliances, industrial motors, vehicle propulsion sources, etc.) 278. Main contactor 301 may be opened to electrically isolate IFB cell electric energy power conductor 260 from electrical energy sources 279 and electrical energy consumers 278. Electrical energy sources 279 and electrical energy consumers 278 are external to electric energy storage system 200.

Thus, the system of FIGS. 1 and 2 provides for an electric power system, comprising: a plurality of electric energy storage cell stacks, each of the plurality of electric energy storage cell stacks including a contactor, the contactor selectively coupling one of the plurality of electric energy storage cell stacks to an electric power conductor in the electric power system; and a controller electrically coupled to the contactor of each of the plurality of electric energy storage cell stacks. The electric power system further comprises executable instructions stored in non-transitory memory of the controller to sequentially couple a plurality of electric energy storage cell stacks to the electric power conductor within the electrical energy storage system according to individual voltages of each of the plurality of electric energy storage cell stacks. The electric power system further comprises executable instructions stored in non-transitory memory of the controller to group each of the plurality of electric energy storage cell stacks into more than one group of electric energy storage cell stacks according to voltages of each of the plurality of electric energy storage cell stacks.

In some examples, the electric power system further comprises additional instructions to sequentially couple each of the more than one group of electric energy storage cell stacks to the electric power conductor within the electrical energy storage system according to voltages of electric energy storage cell stacks included in the more than one groups of electric energy storage cell stacks. The electric power system further comprises a charger coupled to the electric power conductor. The electric power system further comprises executable instructions stored in non-transitory memory of the controller to charge one or more of the plurality of electric energy storage cell stacks.

Referring now to FIG. 3, a prophetic example for operating an electric energy storage system according to the method of FIG. 5 is shown. FIG. 3 includes five plots that show electric energy storage system operating conditions during a sequence where the electric energy storage system is activated. Each of the five plots show operating states of the same operating conditions as shown in each of the other four plots. Therefore, for the sake of brevity, the first plot from the top of FIG. 3 is described in detail, and then only the differences between the first plot and the remaining plots are explained.

In the example of FIG. 3, the voltages of electric energy storage cell stacks with closed contactors are within a threshold voltage of the electric energy storage cell stack with an open contactor and a lowest voltage of electric energy storage cell stacks that have open contactors. Therefore, the electric energy storage cell stacks that have closed contactors are not charged in between the time when a contactor of a first electric energy storage cell stack is closed and when a contactor of a second electric energy storage cell stack is closed. During such conditions, the contactors of the first electric energy storage cell stack and the second electric energy storage cell stack may be closed sooner such that there may be less time between when the contactor of the first electric energy storage cell stack is closed and when the contactor of the second electric energy storage cell stack is closed since there is no charging between contactor closings.

The first plot 300 from the top of FIG. 3 is a plot of electric energy storage cell stack voltage versus electric energy storage cell stack number. In this example, the electric energy storage system includes an actual total number of four electric energy storage cell stacks, which are numbered 1-4. The electric energy storage system cell stacks are arranged in the system shown in FIGS. 1 and 2. Of course, a system with four electric energy cell stacks is not the only configuration that the method of FIG. 5 applies to and it should not be considered as limiting the scope of this disclosure. The first plot shows voltages of the electric energy storage cell stacks (e.g., as determined at an electric energy storage cell with a highest potential voltage in the electric energy storage cell stack) for an electric energy storage system where all contactors of the electric energy storage cell stacks or all contactors directly electrically coupled to the electric energy storage cell stacks are in an open state. Thus, the first plot shows open circuit voltages for electric energy storage cells 1-4. The vertical axis represents electric energy storage cell stack voltage and electric energy storage cell stack voltage increases in the direction of the vertical axis arrow. The horizontal axis shows the numbers of the electric energy storage cell stacks.

The voltage level of each electric energy storage cell stack is different from the voltage level of the other electric energy storage cell stacks. In particular, electric energy storage cell stack number 2 has the highest voltage 351. Electric energy storage cell stack number 3 has the next highest voltage 352 and electric energy storage cell stack number 1 has the next highest voltage 350 after electric energy storage cell stack number 3. Electric energy storage cell stack number 4 has the lowest voltage 353. The differences in electric energy storage cell stack voltages may be attributed to the efficiencies of the individual electric energy storage cell stacks and/or losses of the individual electric energy storage cell stacks.

The second plot 302 from the top of FIG. 3 is a plot of electric energy storage cell stack voltage versus electric energy storage cell stack number when the contactor of electric energy storage cell stack number 4 is closed. The contactor of electric energy storage cell stack number 4 is closed because electric energy storage cell stack number 4 has a lowest voltage of the four electric energy storage cell stacks. Closing the contactor of electric energy storage cell stack number 4 does not change the voltage levels of electric energy storage cell stack numbers 1-3 because closing the contactor electrically couples electric energy storage cell stack number four to the electric power conductor or bus 260 while no other electric energy storage cell stacks are coupled to the electric power conductor or bus 260 and while main contactor 301 is open. The voltage levels of electric energy storage cell stacks 1-4 remain at their prior levels shown in the first plot from the top of FIG. 3.

The third plot 304 from the top of FIG. 3 is a plot of electric energy storage cell stack voltage versus electric energy storage cell stack number when the contactors of electric energy storage cell stack numbers 4 and 1 are closed. The contactor of electric energy storage cell stack number 1 is closed after the contactor of electric energy storage cell stack number 4 is closed because electric energy storage cell stack number 1 has a next lowest voltage of the four electric energy storage cell stacks at the time when all contactors of all electric energy storage cell stacks were open. Closing the contactor of electric energy storage cell stack number 1 causes the voltage of electric energy storage cell number 4 (353) to increase and the voltage of electric energy storage cell number 1 (350) to decrease. The voltage of electric energy storage cell number 4 (353) increases and the voltage of electric energy storage cell number 1 (350) decreases because electrical charge is transferred from electric energy storage cell stack number 1 to electric energy storage cell stack number 4. The combined voltage of electric energy storage cell stack number 1 and electric energy storage cell stack number 4 raises the voltage of electric energy storage cell stack number 1 (350) so that when electric energy storage cell number 2 is eventually electrically coupled to electric energy storage cell number 4, current flow into electric energy storage cell stack number 4 may be reduced as compared to if electric energy storage cell stack number 2 where simply coupled to electric energy storage cell stack number 4. Consequently, a peak amount of current flow into electric energy storage cell stack number four may be reduced. The voltage level of electric energy storage cell stack numbers 2 and 3 remain unchanged because the contactors of electric energy storage cell stack numbers 2 and 3 remain open.

The fourth plot 306 from the top of FIG. 3 is a plot of electric energy storage cell stack voltage versus electric energy storage cell stack number when the contactors of electric energy storage cell stack numbers 4, 1, and 3 are closed. The contactor of electric energy storage cell stack number 3 is closed after the contactor of electric energy storage cell stack number 1 is closed because electric energy storage cell stack number 3 has a next lowest voltage of the four electric energy storage cell stacks at the time when all contactors of all electric energy storage cell stacks were open. Closing the contactor of electric energy storage cell stack number 3 causes the voltage of electric energy storage cell numbers 4 (353) and 1 (350) to increase and the voltage of electric energy storage cell number 3 (352) to decrease. The voltage of electric energy storage cell numbers 4 (353) and 1 (350) increases and the voltage of electric energy storage cell number 3 (352) decreases because electrical charge is transferred from electric energy storage cell stack number 3 to electric energy storage cell stack numbers 1 and 4. The combined voltage of electric energy storage cell stack number 3 and electric energy storage cell stack numbers 4 and 1 raises the voltage of electric energy storage cell stack numbers 1 (350) and 4 (353) so that when electric energy storage cell number 2 is eventually electrically coupled to electric energy storage cell number 4, current flow into electric energy storage cell stack number 4 may be reduced as compared to if electric energy storage cell stack number 2 where simply coupled to electric energy storage cell stack number 4. Consequently, a peak amount of current flow into electric energy storage cell stack number four may be further reduced. The voltage level of electric energy storage cell stack number 2 (351) remains unchanged because the contactor of electric energy storage cell stack number 2 remains open.

The fifth plot 308 from the top of FIG. 3 is a plot of electric energy storage cell stack voltage versus electric energy storage cell stack number when the contactors of electric energy storage cell stack numbers 4, 1, 3, and 2 are closed. The contactor of electric energy storage cell stack number 2 is closed after the contactor of electric energy storage cell stack number 3 is closed because electric energy storage cell stack number 2 has the highest voltage of the four electric energy storage cell stacks at the time when all contactors of all electric energy storage cell stacks were open. Closing the contactor of electric energy storage cell stack number 2 causes the voltage of electric energy storage cell numbers 4 (353), 1 (350), and 3 (352) to increase and the voltage of electric energy storage cell number 2 (352) to decrease. The voltage of electric energy storage cell numbers 4 (353), 1 (350), and 3 (352) increases and the voltage of electric energy storage cell number 2 (351) decreases because electrical charge is transferred from electric energy storage cell stack number 2 to electric energy storage cell stack numbers 1, 4, and 3. The combined voltage of electric energy storage cell stack number 2 and electric energy storage cell stack numbers 4, 1, and 3 raises the voltage of electric energy storage cell stack numbers 1 (350), 4 (353), and 3 (352) in a way that reduces current flow into electric energy storage cell stack numbers 4 and 1 as compared to if all contactors of electric energy storage cell stacks 1-4 were closed contemporaneously. Consequently, the possibility of contactor degradation may be reduced.

In this way, contactors of electric energy storage cells may be closed sequentially in a one after the other fashion so that potential or voltages of electric energy storage cell stacks with lower voltage levels may be increased gradually. This may provide a reduction in peak current flow into electric energy storage cell stacks that were at lower voltages when the process started as compared to conditions where all contactors of all electric energy cell stacks are contemporaneously closed. Thus, contactors of the individual electric energy storage cell stacks are controlled independently and according to voltages of the electric energy storage cell stacks to reduce current flow into electric energy storage cell stacks that exhibit lower open circuit voltages.

Referring now to FIG. 4, a second prophetic example of operating an electric energy storage system according to the method of FIG. 5 is shown. FIG. 4 shows ten plots of control parameters during an electric energy storage system operating sequence. The plots occur at the same time and the plots are time aligned. Vertical lines t0-t6 represent times of interest in the sequence.

The first plot from the top of FIG. 4 is a plot of the electric energy storage system operating state versus time. The vertical axis represents electric energy storage system operating state and the electric energy storage system is activated when trace 402 is at a higher level near the vertical axis arrow. The electric energy storage system is deactivated when trace 402 is at a lower level near the horizontal axis. The horizontal axis represents time and time increase from the left side of the plot to the right side of the plot. Trace 402 represents the operating state of the electric energy storage system.

The second plot from the top of FIG. 4 is a plot of voltage of electric energy storage cell stack number one (e.g., as determined at an electric energy storage cell with a highest potential voltage in electric energy storage cell stack number one) versus time. The vertical axis represents voltage of electric energy storage cell stack number one and voltage of electric energy storage cell stack number one increases in the direction of the vertical axis arrow. The horizontal axis represents time and time increase from the left side of the plot to the right side of the plot. Trace 404 represents the voltage of electric energy storage cell stack number one.

The third plot from the top of FIG. 4 is a plot of the operating state of the contactor of or associated with (e.g., a contactor that selectively couples the electric energy storage cell stack to the electric power conductor or bus 260) electric energy storage cell stack number one versus time. The vertical axis represents the operating state of the contactor of electric energy storage cell stack number one and the contactor of electric energy storage cell stack number one is closed when trace 406 is at a higher level near the vertical axis arrow. The contactor of electric energy storage cell stack number one is open when trace 406 is at a lower level near the horizontal axis. The horizontal axis represents time and time increase from the left side of the plot to the right side of the plot. Trace 406 represents the operating state of the contactor of electric energy storage cell stack number one.

The fourth plot from the top of FIG. 4 is a plot of voltage of electric energy storage cell stack number two (e.g., as determined at an electric energy storage cell with a highest potential voltage in electric energy storage cell stack number two) versus time. The vertical axis represents voltage of electric energy storage cell stack number two and voltage of electric energy storage cell stack number two increases in the direction of the vertical axis arrow. The horizontal axis represents time and time increase from the left side of the plot to the right side of the plot. Trace 408 represents the voltage of electric energy storage cell stack number two.

The fifth plot from the top of FIG. 4 is a plot of the operating state of the contactor of or associated with (e.g., selectively couples the electric energy storage cell stack to the electric power conductor or bus 260) electric energy storage cell stack number two versus time. The vertical axis represents the operating state of the contactor of electric energy storage cell stack number two and the contactor of electric energy storage cell stack number two is closed when trace 410 is at a higher level near the vertical axis arrow. The contactor of electric energy storage cell stack number two is open when trace 410 is at a lower level near the horizontal axis. The horizontal axis represents time and time increase from the left side of the plot to the right side of the plot. Trace 410 represents the operating state of the contactor of electric energy storage cell stack number two.

The sixth plot from the top of FIG. 4 is a plot of voltage of electric energy storage cell stack number three (e.g., as determined at an electric energy storage cell with a highest potential voltage in electric energy storage cell stack number three) versus time. The vertical axis represents voltage of electric energy storage cell stack number three and voltage of electric energy storage cell stack number three increases in the direction of the vertical axis arrow. The horizontal axis represents time and time increase from the left side of the plot to the right side of the plot. Trace 412 represents the voltage of electric energy storage cell stack number three.

The seventh plot from the top of FIG. 4 is a plot of the operating state of the contactor of or associated with (e.g., selectively couples the electric energy storage cell stack to the electric power conductor or bus 260) electric energy storage cell stack number three versus time. The vertical axis represents the operating state of the contactor of electric energy storage cell stack number three and the contactor of electric energy storage cell stack number three is closed when trace 414 is at a higher level near the vertical axis arrow. The contactor of electric energy storage cell stack number three is open when trace 414 is at a lower level near the horizontal axis. The horizontal axis represents time and time increase from the left side of the plot to the right side of the plot. Trace 414 represents the operating state of the contactor of electric energy storage cell stack number three.

The eighth plot from the top of FIG. 4 is a plot of voltage of electric energy storage cell stack number four (e.g., as determined at an electric energy storage cell with a highest potential voltage in electric energy storage cell stack number four) versus time. The vertical axis represents voltage of electric energy storage cell stack number four and voltage of electric energy storage cell stack number four increases in the direction of the vertical axis arrow. The horizontal axis represents time and time increase from the left side of the plot to the right side of the plot. Trace 416 represents the voltage of electric energy storage cell stack number four.

The ninth plot from the top of FIG. 4 is a plot of the operating state of the contactor of or associated with (e.g., a contactor that selectively couples the electric energy storage cell stack to the electric power conductor or bus 260) electric energy storage cell stack number four versus time. The vertical axis represents the operating state of the contactor of electric energy storage cell stack number four and the contactor of electric energy storage cell stack number four is closed when trace 418 is at a higher level near the vertical axis arrow. The contactor of electric energy storage cell stack number four is open when trace 418 is at a lower level near the horizontal axis. The horizontal axis represents time and time increase from the left side of the plot to the right side of the plot. Trace 418 represents the operating state of the contactor of electric energy storage cell stack number four.

The tenth plot from the top of FIG. 4 is a plot of the operating state of the main contactor of the electric energy storage system versus time. The vertical axis represents the operating state of the main contactor of the electric energy storage system and the main contactor of the electric energy storage system is closed when trace 420 is at a higher level near the vertical axis arrow. The main contactor of the electric energy storage system is open when trace 420 is at a lower level near the horizontal axis. The horizontal axis represents time and time increase from the left side of the plot to the right side of the plot. Trace 420 represents the operating state of the main contactor of the electric energy storage system.

At time t0, the electric energy storage system is off and the contactors of all electric energy storage cell stacks are open, thereby electrically isolating the electric energy storage cell stacks from electric power conductor or bus 260. The voltage of electric energy storage cell stack number three (412) is the lowest voltage of the electric energy storage cell stacks. The voltage of electric energy storage cell stack number four (416) is the highest voltage of the electric energy storage cell stacks. The main output contactor is open to electrically isolate the electric energy storage system from external electrical sources and consumers.

At time t1, the electric energy storage system is activated and the contactors of all electric energy storage cell stacks are still open, but shortly thereafter, the contactor of electric energy storage cell stack number three is closed in response to a request to via the electric energy storage system to close contactors of the electric energy storage cell stacks because the voltage of electric energy storage cell stack number three (412) is the lowest voltage of the electric energy storage cell stacks. Closing the contactor of electric energy storage cell stack number three electrically couples electric energy storage cell stack number three to the electric power conductor or bus 260. The contactors of energy storage cell stack numbers one, two, and four remain open. The voltages of the energy storage cell stacks remain unchanged and the main contactor remains in an open state. In this example, electric energy storage cell stack number three is not charged after its contactor is closed because its voltage is within a threshold voltage of the electric energy storage cell stack with a lowest voltage and open contactor (e.g., electric energy storage cell stack number one).

At time t2, the electric energy storage system remains activated and the contactor of electric energy storage cell stack number one is closed in response to a request of the electric energy storage system to close contactors of the electric energy storage cell stacks and a voltage of electric energy storage cell stack number one (404) being within a threshold voltage of the voltage of electric energy storage cell stack number three (412). Shortly after time t2, the voltage of electric energy storage cell stack number one (404) is reduced by a small amount and voltage of electric energy storage cell stack number three (412) is increased by a small amount as change is transferred from electric energy storage cell stack number one to electric energy storage cell stack number three. Number three and number one electric energy storage cell stacks are now electrically coupled to the electric power conductor or bus 260. The contactors of energy storage cell stack numbers two and four remain open. The voltages of the energy storage cell stack numbers two and four remain unchanged and the main contactor remains in an open state.

At time t3, electric energy storage cell stack numbers three and one begin to be charged (e.g., receive charge) from a charger that is electrically coupled to the electric power conductor or bus 260. Electric energy storage cell stack numbers three and one are charged because the voltages of electric energy storage cell stack number two and the voltage of electric energy storage cell stack number four are not within a threshold voltage of the voltage of bus 260 (e.g., the voltage of electric energy storage cell stack numbers one and three). The voltages of the energy storage cell stack numbers two and four remain unchanged and the main contactor remains in an open state.

At time t4, the electric energy storage system remains activated and the contactor of electric energy storage cell stack number two is closed in response to a request of the electric energy storage system to close contactors of the electric energy storage cell stacks and a voltage of electric energy storage cell stack number two being within a threshold voltage of the voltage of electric energy storage cell stack numbers one and three. Shortly after time t4, the voltage of electric energy storage cell stack number two (408) is reduced by a small amount and voltage of electric energy storage cell stack numbers one (404) and three (412) are increased by a small amount as change is transferred from electric energy storage cell stack number two to electric energy storage cell stack numbers one and three. Electric energy storage cell stack numbers two, three and one are now electrically coupled to the electric power conductor or bus 260. The contactor of energy storage cell stack number four remains open. The voltages of the energy storage cell stack numbers four remains unchanged and the main contactor remains in an open state.

Between time t4 and time t5, electric energy storage cell stack numbers one, three, and two begin to be charged from a charger that is electrically coupled to the electric power conductor or bus 260. Number one, two, and three electric energy storage cell stacks are charged because the voltage of electric energy storage cell stack number four is not within a threshold voltage of the voltage of conductor or bus 260 (e.g., the voltage of electric energy storage cell stack numbers one, two, and three). The voltage of electric energy storage cell stack number four remains unchanged and the main contactor remains in an open state.

At time t5, the electric energy storage system remains activated and the contactor of electric energy storage cell stack number four is closed in response to a request of the electric energy storage system to close contactors of the electric energy storage cell stacks and a voltage of electric energy storage cell stack numbers four being within a threshold voltage of the voltage of electric energy storage cell stack numbers one, two, and three. Shortly after time t5, the voltage of electric energy storage cell stack number four (416) is reduced by a small amount and voltage of electric energy storage cell stack numbers one, three, and two are increased by a small amount as change is transferred from electric energy storage cell stack number four to electric energy storage cell stack numbers one (404), three (414), and two (408). All electric energy storage cell stacks are now electrically coupled to the electric power conductor or bus 260. The main contactor remains in an open state and all the electric energy storage cell stacks are charged via the charger.

At time t6, the main contactor is closed and the charger is deactivated when charge of all electric energy storage cell stacks are within a threshold voltage of a desired voltage. All of the contactors of all of the electric energy storage cell stacks remain in closed states so that external sources may supply electrical energy from electric energy storage system 200 or so that external electric power consumers may draw electrical energy from electric energy storage system 200.

In this way, contactors of electric energy storage cell stacks may be closed and charge may be applied to electric energy storage cell stacks so that when one or more contactors of other electric energy storage cell stacks close, current flow throughout the electric energy storage system may be below desired levels. Further, when there is little difference between levels of charge of electric energy storage cell stacks, contactors of electric energy storage cell stacks may be closed without providing charge to electric energy storage cell stacks via the charger.

Referring now to FIG. 5, a method for operating the electric energy system as shown in FIGS. 1 and 2 is shown. The method of FIG. 5 may be included as executable instructions stored in non-transitory memory of the system of FIGS. 1-2. In addition, the methods of FIG. 5 may work in cooperation with the system of FIGS. 1 and 2 to receive data and adjust actuators to control the system of FIGS. 1 and 2.

At 502, method 500 judges if operation of the electric energy storage system is requested. Operation of the electric energy storage system may be requested via input to a human/machine interface, a controller, or other source. If method 500 judges that operation of the electric energy storage system is requested, the answer is yes and method 500 proceeds to 504. Otherwise, the answer is no and method 500 proceeds to 550.

At 550, method 500 deactivates electrolyte pumps to conserve energy. The electrolyte pumps may be deactivated via ceasing to supply energy to the electrolyte pumps. Method 500 proceeds to 552.

At 552, method 500 opens one or more main or output contactors to electrically decouple the electric energy storage system from external power sources or consumers. In addition, method 500 opens all the of the contactors of the electric energy storage cell stacks so that the electric energy storage cell stacks are electrically decoupled from each other. Method 500 proceeds to exit.

At 504, method 500 activates electrolyte pumps to operate the electric energy storage cells. The electrolyte pumps may be activated via supplying energy to the electrolyte pumps. Method 500 proceeds to 506.

At 506, method 500 judges if the electric energy storage system has requested closing all contactors of or associated with (e.g., a contactor that selectively couples the electric energy storage cell stack to the electric power conductor or bus 260) electric energy storage cell stacks. The electric energy storage system may request that all contactors of or associated with electric energy storage cell stacks be closed after the electric energy storage system is activated. If method 500 judges that the electric energy storage system has requested closing all contactors of or associated with electric energy storage cell stacks, then the answer is yes and method 500 proceeds to 508. Otherwise, the answer is no and method 500 returns to 502. At this time, the contactors of each electric energy storage cell stack in a plurality of electric energy storage cell stacks within the electric energy storage system are open.

At 508, method 500 determines voltages of all electric energy cell stacks. In one example, controller 150 shown in FIGS. 1 and 2 samples the highest potential (e.g., voltage) of electric energy storage cells of each electric energy storage cells stack. If all the contactors of each electric energy storage cell stack in a plurality of electric energy storage cell stacks within the electric energy storage system are open, then the electric energy storage cell stacks are electrically de-coupled from each other and the controller receives open circuit voltages of each electric energy storage cell stack. Method 500 stores each voltage of each electric energy storage cell stack in controller memory. Further, method 500 determines which, if any, contactors of or associated with electric energy storage cell stacks is open. Method 500 may determine which contactors of or associated with electric energy storage cell stacks are open via values of variables stored in controller memory that indicate whether or not the controller has commanded the contactors open or closed.

Method 500 may arrange a list of electric energy storage cell stacks in controller memory by number or location of the electric energy storage cell stack in the electric energy storage system and by the voltages of the electric energy storage cell stacks. The list may order the electric energy storage cell stacks beginning with the electric energy storage cell stack with the lowest voltage to the electric energy storage cell stack with the highest voltage. For example, if the electric energy storage system includes four electric energy storage cell stacks with the following voltages: electric energy storage cell stack number 1 (4 volts); electric energy storage cell stack number 2 (5 volts); electric energy storage cell stack number 3 (1.5 volts); and electric energy storage cell stack number 4 (3 volts), then method 500 may arrange a list of the cell stacks as follows: electric energy storage cell stack number 3; electric energy storage cell stack number 4; electric energy storage cell stack number 1; and electric energy storage cell stack number 2. This arrangement of cell stacks may be the basis for activating contactors of or associated with the electric energy storage cell stacks. In particular, the contactors may be closed according to the order of electric energy storage cell stack numbers in the list. The list may be stored in an area of controller memory.

In another example, Method 500 may arrange a list of groups of electric energy storage cell stacks in controller memory by the voltage ranges of the electric energy storage cell stacks. The list may order the groups of electric energy storage cell stacks in an order from the electric energy storage cell stack group with the lowest voltage range to the electric energy storage cell stack group with the highest voltage. For example, if the electric energy storage system includes six electric energy storage cell stacks with the following voltages: electric energy storage cell stack number 1 (4 volts); electric energy storage cell stack number 2 (5 volts); electric energy storage cell stack number 3 (1.5 volts); electric energy storage cell stack number 4 (3 volts), electric energy storage cell stack number 5 (6 volts), and electric energy storage cell stack number 6 (1 volt), and where the voltages included in the groups are 0-2 volts (first range); 2-4.5 volts (second range); and 4.5-7 volts (third range), then method 500 may arrange a list or order of the cell stacks as follows: group 1 (cell stack numbers 3 and 6); group 2 (cell stack numbers 1 and 4); group 3 (cell stack numbers 2 and 5). The contactors of the electric energy storage cell stacks may then be activated according to the order of groups beginning from group 1 and ending with group 3. The groups may be stored in a list in an area of controller memory, and membership in a group is based on electric energy storage cell stack voltage. Method 500 proceeds to 510.

At 510, method 500 judges if any contactors of or associated with electric energy storage cell stacks are closed in the electric energy storage system. If so, the answer is yes and method 500 proceeds to 511. Otherwise, the answer is no and method 500 proceeds to 512. If the answer is yes, electric energy storage cell stacks that are electrically coupled to the electric power conductor or bus 260 may be charged to within a threshold voltage of a electric energy storage cell stack that is not electrically coupled to the electric power conductor or bus 260. Alternatively, electric energy storage cell stacks that are electrically coupled to the electric power conductor or bus 260 may be charged to predetermined levels. The predetermined levels may be based on expected current flow through the contactors.

At 512, method 500 closes an open contactor of or associated with the electric energy storage cell stack that exhibits the lowest voltage of electric energy storage cell stacks that have open contactors. For example, if the electric energy storage system includes four electric energy storage cell stacks arranged in a list with an order of electric energy storage cell stack number 3; electric energy storage cell stack number 4; electric energy storage cell stack number 1; and electric energy storage cell stack number 2 as described at 508, then the contactor of electric energy storage cell stack number 3 may be closed if no other contactors of electric energy storage cell stacks are closed. If the contactors for electric energy storage cell stack numbers 3 and 4 are closed, then the contactor of electric energy storage cell stack number 1 may be closed.

Alternatively, if the electric energy storage cell stacks are arranged in groups, then method 500 closes open contactors of or associated with the group of electric energy storage cell stack that includes the lowest voltages of electric energy storage cell stacks that have open contactors. For example, if the electric energy storage system includes three groups of electric energy storage cell stacks arranged in a list with an order of group 1 (cell stack numbers 3 and 6); group 2 (cell stack numbers 1 and 4); group 3 (cell stack numbers 2 and 5), then the contactor of electric energy storage cell stacks in group 1 may be closed if no other contactors of electric energy storage cell stacks are closed. If the contactors for group 1 of the electric energy storage cell stack groups are closed, then the contactor of group 2 of the electric energy storage cell stack groups may be closed since group 2 includes electric energy storage cell stacks having the lowest voltages of electric energy storage cell stacks with open contactor. Method 500 proceeds to 514.

At 514, method 500 activates a charger and charges electric energy storage cell stacks. In particular, method 500 charges electric energy cell stacks that are electrically coupled to the electric power conductor or bus 260. The charger may charge the electric energy storage cell stacks that are coupled to the electric power conductor or bus 260 to a voltage that is within a threshold voltage of an electric energy storage cell stack that has an open contactor and lowest voltage among electric energy storage cell stacks that have open contactors. Alternatively, charger may charge the electric energy storage cell stacks that are coupled to the electric power conductor or bus 260 to a predetermined voltage. Further, if the electric energy storage cell stacks that are coupled to the electric power conductor or bus 260 are within a threshold voltage of an electric energy storage cell stack that has an open contactor and lowest voltage among electric energy storage cell stacks that have open contactors, then the charger may not be activated and may not supply charge to the electric energy storage cell stacks that are coupled to the electric power conductor or bus 260. Method 500 proceeds to 516.

At 516, method judges if all contactors of or associated with electric energy storage cell stacks are closed in the electric energy storage system. In one example, method 500 may judge that all contactors of or associated with electric energy storage cell stacks are closed in the electric energy storage system based on values of variables stored in controller memory. Alternatively, the contactors may directly indicate their operating state to the controller so that the controller may make the determination. If method 500 judges that all contactors of or associated with electric energy storage cell stacks in the electric energy storage system are closed, then the answer is yes and method 500 proceeds to 518. Otherwise, the answer is no and method 500 returns to 508.

At 518, method 500 closes the main contactor of the electric energy storage system so that the electric energy storage cell stacks are coupled to external electrical power consumers and sources. Further, method 500 may deactivate the charger at 518. Method 500 proceeds to exit.

At 511, method 500 judges if a voltage of an electric energy storage cell stack with a lowest voltage among electric energy storage cell stacks with open contactors is within a desired range of a threshold voltage. If so, the answer is yes and method 500 proceeds to 512. Otherwise, the answer is no and method 500 proceeds to 514.

In one example, method 500 may charge electric energy storage cells stacks that are coupled to the electric power conductor 260 when a voltage of an electric energy storage cell stack that is not electrically coupled to the electric power conductor 260 is not within a desired range. The desired range may be a voltage range that is within a threshold voltage of electric energy storage cell stacks that are electrically coupled to the electric power conductor 260. For example, if the desired range is 5 volts and electric energy storage cells stacks that are electrically coupled to the electric power conductor 260 are at 50 volts while an electric energy storage cells stack with a lowest voltage that is not electrically coupled to the electric power conductor 260 output voltage is 65 volts, then the answer is no and method 500 proceeds to 514. However, if the output voltage of the electric energy storage cells stack with the lowest voltage that is not electrically coupled to the electric power conductor 260 is 54 volts and within 5 volts of the 50 volts of electric energy storage cells stacks that are electrically coupled to the electric power conductor 260, then the charger may not charge electric energy storage cells stacks that are electrically coupled to the electric power conductor 260.

Alternatively, method 500 may charge electric energy storage cells stacks that are coupled to the electric power conductor 260 when a voltage of a group of electric energy storage cell stacks that are not electrically coupled to the electric power conductor 260 and that have a lowest voltage level of groups that are not electrically coupled to the electric power conductor 260 are not within a desired range of the voltage of electric energy storage cells stacks that are coupled to the electric power conductor 260. The desired range may be a voltage range that is within a threshold voltage of electric energy storage cell stacks that are electrically coupled to the electric power conductor 260. For example, if the desired range is 5 volts and electric energy storage cells stacks that are electrically coupled to the electric power conductor 260 are at 50 volts while a group of electric energy storage cells stack with a lowest voltage of groups that are not electrically coupled to the electric power conductor 260 output voltage is 65 volts, then the answer is no and method 500 proceeds to 514. However, if the output voltage of the group of electric energy storage cells stack with the lowest voltage that is not electrically coupled to the electric power conductor 260 is 52 volts and within 5 volts of the 50 volts of electric energy storage cells stacks that are electrically coupled to the electric power conductor 260, then the charger may not charge electric energy storage cells stacks that are electrically coupled to the electric power conductor 260.

In this way, method 500 may raise voltages or charge of electric energy storage cell stacks that coupled to electric power conductor 260 so that when contactors or groups of contactors that are open are subsequently closed, current flow into electric energy storage cell stacks that are coupled to electric power conductor 260 is not greater than is desired.

Thus, the method of FIG. 5 provides for a method for operating an electrical energy storage system, comprising: sequentially closing a plurality of contactors that selectively electrically couple a plurality of electrical energy storage cell stacks to an electric power conductor within the electrical energy storage system according to individual voltages of each of the plurality of electric energy storage cell stacks via a controller. The method includes where sequentially closing a plurality of contactors that selectively couple a plurality of electric energy storage cell stacks to an electric power conductor within the electrical energy storage system according to individual voltages of each of the plurality of electric energy storage cell stacks includes closing the plurality of contactors in an order beginning with an energy cell stack of the plurality of cell stacks having a voltage less than or equal to voltages of all other energy cell stacks included in the plurality of electric energy storage cell stacks, the order ending with an energy cell stack of the plurality of cell stacks having a voltage greater than or equal to voltages of all other energy cell stacks included in the plurality of electric energy storage cell stacks.

The method of FIG. 5 further comprises determining voltages of the plurality of electric energy storage cell stacks via the controller. The electric power system further comprises charging one or more of the plurality of electric energy storage cell stacks via a charger during a time between closing a first of the plurality of contactors and a second of the contactors. The electric power system includes where the charger is coupled to the electric power conductor. The electric power system further comprises charging the one or more of the plurality of electric energy storage cell stacks to a threshold voltage before closing additional contactors included in the plurality of contactors. The method includes where the threshold voltage is based on a voltage of one or more of the plurality of electric energy storage cell stacks that have not been coupled to the electric power conductor. The method also includes where the threshold voltage is a predetermined voltage.

The method of FIG. 5 also provides for a method for operating an electrical energy storage system, comprising: sensing voltages of each of a plurality of electric energy storage cell stacks via a controller; grouping each of the plurality of electric energy storage cell stacks into more than one groups of electric energy storage cell stacks according to the voltages of each of the plurality of electric energy storage cell stacks; and via the controller, sequentially coupling each of the more than one groups of electric energy storage cell stacks to an electric power conductor within the electrical energy storage system according to voltages of electric energy storage cell stacks included in the more than one groups of electric energy storage cell stacks. The method includes where the more than one group of electric energy storage cell stacks are based on voltage ranges.

In some examples, the method includes where membership of an electric energy storage cell stack included in the plurality of electric energy storage cell stacks into one of the more than one groups of electric energy storage cell stacks is based on a voltage of the electric energy storage cell stack. The method further comprises charging one or more of the plurality of electric energy storage cell stacks via a charger during a time between coupling a first group of the groups of electric energy storage cell stacks to the electric power conductor and coupling a second group of the groups of electric energy storage cell stacks to the electric power conductor. The method further comprises charging the one or more of the plurality of electric energy storage cell stacks to a threshold voltage before coupling the second group of electric energy storage cell stacks to the electric power conductor. The method includes where the threshold voltage is based on a voltage of one or more of the plurality of electric energy storage cell stacks that have not been coupled to the electric power conductor.

Note that the example control and estimation routines included herein can be used with various electric energy storage system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various described hardware components in combination with one or more controllers.

This concludes the description. The reading of it by those skilled in the art would bring to mind many alterations and modifications without departing from the spirit and the scope of the description.

The invention claimed is:

1. A method for operating an electrical energy storage system including an iron flow battery, comprising:
   sequentially closing a plurality of contactors that selectively couples a plurality of iron flow battery electric energy storage cell stacks to an electric power conductor within the electrical energy storage system according to individual voltages of each of the plurality of iron flow battery electric energy storage cell stacks via a controller,
   where each of the plurality of contactors is positioned in series with one of the plurality of iron flow battery electric energy storage cell stacks, and
   where the plurality of iron flow battery electrical energy storage cell stacks is electrically coupled to one another in a parallel arrangement; and
   selectively electrically isolating a portion of the plurality of iron flow battery electric energy storage cell stacks through operation of one or more contactors when one or more of the plurality of iron flow battery electric energy storage cell stacks is flushed with water.

2. The method of claim 1, where sequentially closing the plurality of contactors that selectively couples the plurality of iron flow battery electric energy storage cell stacks to the electric power conductor within the electrical energy storage system according to individual voltages of each of the plurality of iron flow battery electric energy storage cell stacks includes closing the plurality of contactors in an order beginning with one of the plurality of contactors positioned in series with an iron flow battery electric energy storage cell stack of the plurality of iron flow battery electric energy storage cell stacks having a voltage less than or equal to voltages of all other iron flow battery electric energy storage cell stacks included in the plurality of iron flow battery electric energy storage cell stacks, the order ending with an iron flow battery electric energy storage cell stack of the plurality of iron flow battery electric energy storage cell stacks having a voltage greater than or equal to voltages of all other iron flow battery electric energy cell stacks included in the plurality of iron flow battery electric energy storage cell stacks.

3. The method of claim 1, where sequentially closing the plurality of contactors that selectively couples the plurality of iron flow battery electric energy storage cell stacks to the electric power conductor within the electrical energy storage system according to individual voltages of each of the plurality of iron flow battery electric energy storage cell stacks includes closing the plurality of contactors in an order from one of the plurality of contactors positioned in series with an iron flow battery electric energy storage cell stack of the plurality of iron flow battery electric energy storage cell stacks having a lowest voltage to one of the plurality of contactors positioned in series with an iron flow battery electric energy storage cell stack of the plurality of iron flow battery electric energy storage cell stacks having a highest voltage.

4. The method of claim 1, further comprising charging one or more of the plurality of iron flow battery electric energy storage cell stacks via a charger during a time between closing a first of the plurality of contactors and a second of the plurality of contactors.

5. The method of claim 4, where the charger is coupled to the electric power conductor.

6. The method of claim 5, further comprising charging the one or more of the plurality of iron flow battery electric energy storage cell stacks to a threshold voltage before closing additional contactors included in the plurality of contactors.

7. The method of claim 6, where the threshold voltage is based on a voltage of one or more of the plurality of iron flow battery electric energy storage cell stacks that have not been coupled to the electric power conductor.

8. A method for operating an electrical energy storage system including an iron flow battery, comprising:
via a controller, sensing voltages of each of a plurality of iron flow battery electric energy storage cell stacks;
via the controller, grouping each of the plurality of iron flow battery electric energy storage cell stacks into more than one group of iron flow battery electric energy storage cell stacks according to the voltages of each of the plurality of iron flow battery electric energy storage cell stacks; and
via the controller, sequentially coupling each of the more than one group of iron flow battery electric energy storage cell stacks to an electric power conductor within the electrical energy storage system according to voltages of the plurality of iron flow battery electric energy storage cell stacks included in the more than one group of iron flow battery electric energy storage cell stacks,
where the plurality of iron flow battery electric energy storage cell stacks is electrically coupled in a parallel arrangement, and
where the more than one group of iron flow battery electric energy storage cell stacks are coupled to the electric power conductor by closing a plurality of contactors positioned in series with the more than one group of iron flow battery electric energy storage cell stacks; and
selectively electrically isolating a portion of the plurality of iron flow battery electric energy storage cell stacks through operation of one or more contactors when one or more of the plurality of iron flow battery electric energy storage cell stacks is flushed with water.

9. The method of claim 8, where the more than one group of iron flow battery electric energy storage cell stacks are based on voltage ranges.

10. The method of claim 9, where membership of an iron flow battery electric energy storage cell stack included in the plurality of iron flow battery electric energy storage cell stacks into one of the more than one group of iron flow battery electric energy storage cell stacks is based on a voltage of the iron flow electric energy storage cell stack.

11. The method of claim 8, further comprising charging one or more of the plurality of iron flow battery electric energy storage cell stacks via a charger during a time between coupling a first group of the more than one group of iron flow battery electric energy storage cell stacks to the electric power conductor and coupling a second group of the more than one group of iron flow battery electric energy storage cell stacks to the electric power conductor.

12. The method of claim 11, further comprising charging the one or more of the plurality of iron flow battery electric energy storage cell stacks to a threshold voltage before coupling the second group of iron flow battery electric energy storage cell stacks to the electric power conductor.

13. The method of claim 12, where the threshold voltage is based on a voltage of one or more of the plurality of iron flow battery electric energy storage cell stacks that have not been coupled to the electric power conductor.

14. An electric power system including an iron flow battery, comprising:
a plurality of iron flow battery electric energy storage cell stacks, where each of the plurality of iron flow battery electric energy storage cell stacks includes a contactor and the contactor selectively couples one of the plurality of iron flow battery electric energy storage cell stacks to an electric power conductor in the electric power system;
a controller electrically coupled to the contactor of each of the plurality of iron flow battery electric energy storage cell stacks,
where each contactor is positioned in series with one of the plurality of iron flow battery electric energy storage cell stacks, and
where the plurality of iron flow battery electric energy storage cell stacks is electrically coupled to one another in a parallel arrangement; and
executable instructions stored in non-transitory memory of the controller to selectively electrically isolate a portion of the plurality of iron flow battery electric energy storage cell stacks through operation of one or more of the contactors when one or more of the iron flow battery electric energy storage cell stacks are flushed with water.

15. The electric power system of claim 14, further comprising executable instructions stored in non-transitory memory of the controller to sequentially couple the plurality of iron flow battery electric energy storage cell stacks to the electric power conductor within the electric power system according to individual voltages of each of the plurality of iron flow battery electric energy storage cell stacks.

16. The electric power system of claim 15, further comprising executable instructions stored in non-transitory memory of the controller to group each of the plurality of iron flow battery electric energy storage cell stacks into more than one group of iron flow battery electric energy storage cell stacks according to the individual voltages of each of the plurality of iron flow battery electric energy storage cell stacks.

17. The electric power system of claim 16, further comprising additional executable instructions to sequentially couple each of the more than one group of iron flow battery electric energy storage cell stacks to the electric power conductor within the electric power system according to voltages of the iron flow battery electric energy storage cell stacks included in the more than one group of iron flow battery electric energy storage cell stacks.

18. The electric power system of claim 14, further comprising executable instructions stored in non-transitory memory of the controller to determine voltages of each of the plurality of iron flow battery electric energy storage cell stacks and sequentially couple the plurality of iron flow battery electric energy storage cell stacks from an iron flow battery energy storage cell stack with a lowest voltage to an iron flow battery energy storage cell stack with a highest voltage.

* * * * *